Patented Nov. 19, 1935

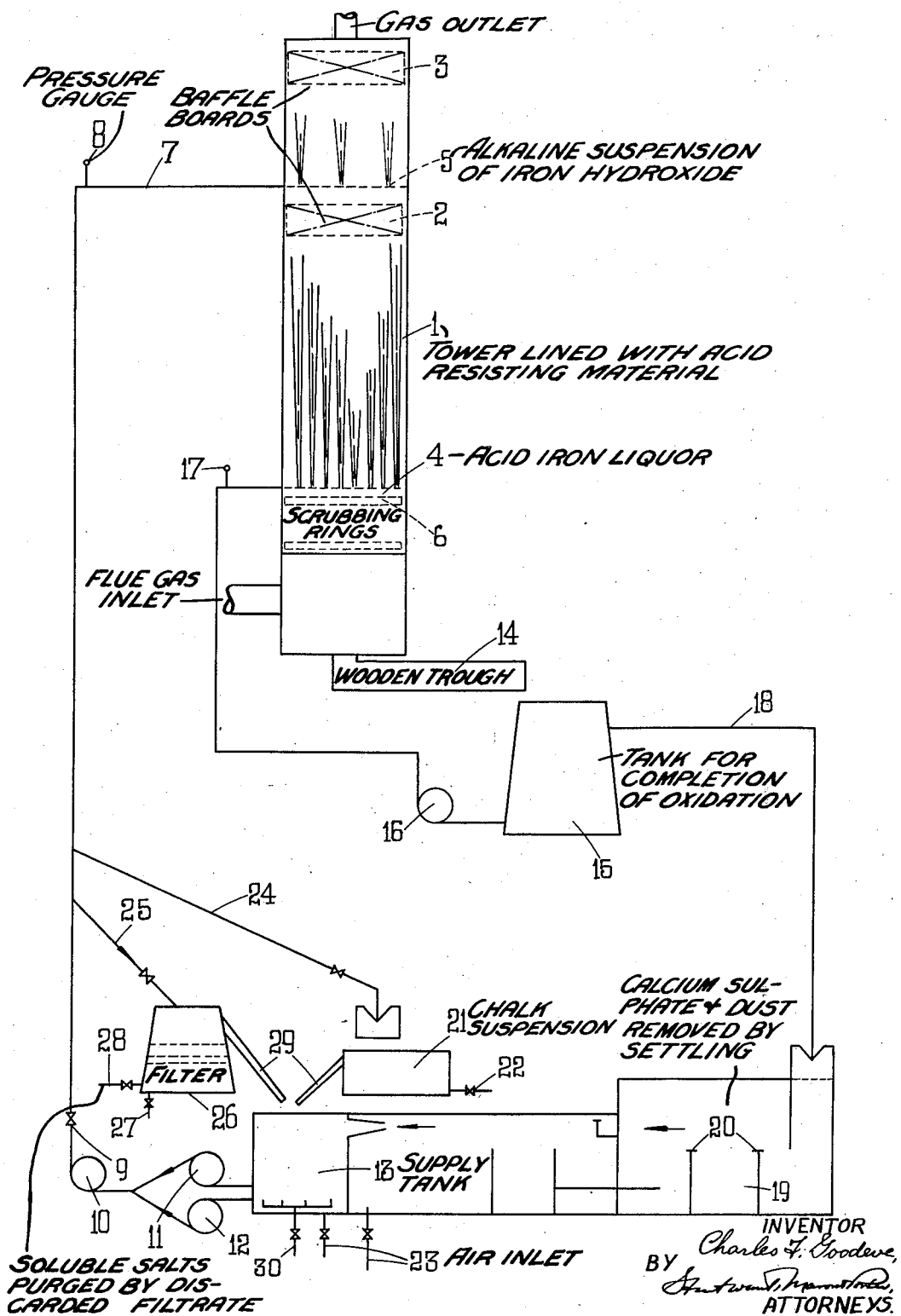

2,021,548

UNITED STATES PATENT OFFICE 2,021,548

REMOVAL OF SULPHUR DIOXIDE FROM GASES

Charles Frederick Goodeve, London, England

Application May 24, 1932, Serial No. 613,287
In Great Britain June 19, 1931

1 Claim. (Cl. 23—2)

This invention relates to an improved process of removing sulphur dioxide from gases, especially flue gases.

It is already known that the oxidation of sulphur dioxide in such gases can be assisted by the presence of catalysts which appear to exert a favorable influence in conjunction with the solid particles normally present in flue gas. (See British Patent No. 334,660.)

One object of the invention is to provide improved means of removing sulphur trioxide, sulphuric acid and other compounds of sulphur, together with flue dust and grit. A further most important object of the invention is to provide a non-effluent process. There is a minimum or very small loss of washing liquor and this may be effected according to the invention in that the circulating fluid may be continuously by-passed in order to remove sulphur compounds in the insoluble form and return the liquor to the cycle. It is often of great importance to avoid the production of any effluent beyond that strictly necessary for purposes hereinafter described since in large scale installations, e. g. when treating enormous volumes of flue gases, it is important to economize water as far as possible.

In using the term "non-effluent", it will be understood that there are permissive small variations in the quantity of water in circulation depending partly upon the humidity of the gas. Another object of the invention is to provide means to purge the system from accumulations of soluble salts such as sodium and magnesium salts and dithionates. A further object of the invention is to avoid losses of catalyst as far as possible, e. g. in the process of removing insoluble sulphur compounds or when purging the system of accumulations of undesired soluble salts.

Further objects of the invention are to provide certain adjustments of hydrogen ion concentration with the object of facilitating the process, and to provide means for removing sulphur compounds in an insoluble form at appropriate points in a cyclic process.

In general, it will be seen that the principal objects of the invention are to secure satisfactory removal of sulphur compounds with the minimum expenditure of reagents, catalysts and of water. The scope of the invention is defined in the appended claim.

The invention will now be described by way of example with reference to the accompanying flow sheet and in this connection it will be noted that although quantities of liquid are mentioned by way of example these in no way limit the invention since, obviously, extremely wide variations in quantities and concentrations are possible within the scope of the invention herein defined.

In the drawing 1 is a tower lined with acid-resisting material. The flue gases are supplied at the bottom and removed at the top by suitable means. The tower is provided with baffle boards 2 and 3 and with sprays 4 and 5. Scrubbing rings 6 may be provided.

The outer circulation comprises an alkaline suspension of iron hydroxide which is introduced under pressure through the sprays 5 through the line 7 supplied with a pressure gauge 8. The line 7 is connected with a non-return valve 9 and supplied by the pumps 10, 11 and 12 which must be capable of dealing with liquid containing suspended matter. In order to avoid erosion of the pump glands there is a slight inward flow of water which is removed from the system as hereafter described. The suspension supplied by pumps 11 and 12 is obtained from the tank 13 and the supply to this tank will be described in detail hereafter.

Returning to the tower, the alkaline suspension falls in counter-current with the gas and runs through a wooden discharge trough 14 provided with a V-notch and connecting with a large tank 15. Sufficient storage space must be provided to allow for fluctuations in supply. In this passage down the tower the liquid becomes acid and it is an important feature of the invention that while the absorption of sulphur dioxide is extremely rapid the oxidation requires a certain amount of time and therefore the tank 15 must be of large capacity. The oxidation is thus completed after the liquor has left the absorption apparatus by allowing sufficient time to elapse before further treatment.

Part of the liquid from tank 15 consisting of acid solution of iron sulphate is used to form an inner circulation by pumping it through pump 16 past pressure gauge 17 through sprays 4. It will be seen therefore that the gas in the tower first comes in contact with the inner circulation of acid iron sulphate supplied through sprays 4 after which further sulphur dioxide is removed through the outer circulation of alkaline iron hydroxide introduced through sprays 5. The liquid supplied by both these circulating systems is collected in the common reservoir 15.

The acidic effluent from 15 contains dust and calcium sulphate in suspension and part of this is therefore removed through line 18 into tank 19 which is provided with baffles 20 and a weir.

After removing the bulk of the dust and calcium sulphate the clarified solution of iron sulphate is supplied to tank 13 when the calculated quantity of chalk is introduced in the form of a suspension from the chalk tank 21 which is supplied with air through 22 for the purpose of mixing. Tank 13 is supplied with air through pipe 30 and further oxidation of the suspension takes place in this tank. Drain pipes 23 are provided.

In order to avoid the introduction of excess of water into the system solid chalk is mixed in tank 21 with a portion of liquid by-passed through line 24 with part of the liquid from the circulating suspension.

The necessary purge to remove soluble salts, for example magnesium salts, is obtained by by-passing a small quantity of the circulating alkaline suspension through line 25 and filter 26. The filtered liquid is removed through the draincock 27. From time to time the precipitated catalyst and any calcium sulphate present is removed and returned to the system by supplying water through pipe 28 and allowing the filter to overflow through pipe 29.

In this apparatus it will be appreciated that parts exposed to acid iron sulphate solution ought not normally to be made of metallic iron. Rubber pipes may be used.

In a particular example, the inner circulation may be seven times the outer circulation in volume. The content of iron may be, for example, from 0.2 to 1.0% of iron which may be added as ferrous sulphate since oxidation takes place during circulation. $P^H$ of the acid solution is preferably from 1.0 to 2.5% but it is desirable to avoid undue acidity of this solution.

It will be seen that in steady operation the quantity of chalk added will be practically chemically equivalent to the quantity of sulphur oxides and acids removed and except for the fraction removed as purge, there will be no effluent so that substantially the same volume of water is continuously recirculated.

Other catalysts can be used, e. g. manganese salts, but iron salts are preferred.

I declare that what I claim is:—

The process of removing sulphur dioxide from flue gases which consists in treating the gases with an acid solution of iron sulphate and then with an alkaline suspension of iron hydroxide.

CHARLES FREDERICK GOODEVE.